United States Patent Office 3,342,760
Patented Sept. 19, 1967

3,342,760
EXPANDABLE POLYMERS
Daniel J. Rode, Coraopolis, and Glenn Greenawald, Bethel Park, Pa., assignors to Koppers Company, Inc., a corporation of Delaware
No Drawing. Filed Oct. 26, 1961, Ser. No. 147,715
7 Claims. (Cl. 260—2.5)

This invention relates to improvements in the production of expandable thermoplastics and more particularly to improvements in the process of impregnating particles of styrene polymers with a hydrocarbon blowing agent.

Expandable thermoplastics are those thermoplastics which are capable, on the application of heat, of foaming up or swelling to form a mass of discrete cells. This foamed styrene polymer combines in a unique manner a useful combination of properties. These properties are lightweight, of high insulating value, buoyancy and impermeability to water. This unique combination of properties permits the use of the expanded styrene polymer in such diverse fields as low temperature insulation, packaging, refrigeration containers and flotation equipment. Particular applications include, for example, insulating panels used in refrigerator cars, commercial and home refrigerators, packaging forms for apparatus, such as electric typewriters, surfboards, sail boats, life jackets, as well as building panels.

One widely used method of producing expandable polymers of styrene is to first produce the polymer in bead form and thereafter impregnate the beads with a blowing agent. The beads are generally produced by suspension polymerization which is described by Boundy and Boyer in their book, Styrene, Its Polymers, Copolymers and Derivatives, chapter VII. This process of suspension polymerization involves the suspension of a polymerizable monomer in water with the aid of a suspension stabilizer which may be any one of the group of materials, organic or inorganic, such as, polyvinyl alcohol, hydroxyethyl cellulose, talc, sodium phosphate, etc. The polymerization is instituted generally by a free-radical producing catalyst which is initiated by heating. At the completion of polymerization, the polymer is in the shape of beads or spheres having a size in the range of 10–40 mesh. Other sizes from less than 80 mesh to about 3/4 by 1/2 inch may be made for special purposes.

Suspension polymerization on a commercial scale is carried out in reactors of the type known as "flanged head." In this type of reactor, the "head" or top is removable, being secured to the battery of the reactor by flanges which are secured by a large number of bolts. Use of this type of reactor is almost mandatory because occasionally there occurs, because of human error or mechanical failure, the loss of the monomer suspension. This may result in the formation of a solid lump of polymer in the reactor. The removal of this polymer lump with any degree of facility requires that it be accessible so that it may be gotten out of the reactor. The simplest method of doing this is to take off the entire top of the reactor.

The portions of the reactor which contact the reactants must be constructed of an inert material so that there is no contamination of or interference with the polymerization reactor. The material most often used for this purpose in the reactors is glass.

Because of the design limitations imposed by the combination of "flange head" design and glass lining, the ultimate pressure which can be tolerated in even the most advance design factors is about 125 p.s.i.g.

In addition to the design limitation on the reactor, there is a further limitation dictated by statutory safety requirements. This is the use of safety valve type devices. In the polymerization kettle, the safety valve device is a rupture disk, that is, a disk which will rupture on the application of some predetermined pressure. These rupture disks are made of metal. Because of this, they fatigue and render themselves susceptible to rupture at pressures below their rated pressure if they are continuously exposed to pressures close to their ultimate or rupture point. Because of statutory requirements, this cannot be alleviated by use of higher rated seals so the only feasible alternative open is to run the reactor at lower than rated pressures. Thus, there is an operating limit of 85% of rated pressure on the preferred glass-lined flanged top reactor. In the case of reactors now being built, this is about 106 p.s.i.g. (85% of 125 p.s.i.g.) while in most older equipment, it is even less, 85 p.s.i.g. (85% of 100 p.s.i.g.).

There is thus a definite maximum limit of the pressure which can be applied to any given reactor. This pressure will be referred to as the critical pressure.

The impregnation of the beads produced by suspension polymerization is advantageously carried out in the same reactor as the polymerization, thus avoiding the expense and time involved in the transfer to another reactor.

The beads produced by the suspension process are treated to render them expandable by impregnating them with a hydrocarbon blowing agent so that on the application of heat, they expand. Such a process is described in U.S. Patent 2,983,692, "Preparation of Expandable Ethylenically Unsaturated Polymer Particles and Cellular Products Therefrom," which is assigned to the assignee of the present application. Another similar process is described in U.S. Patent 2,950,261. Basically, the process involves suspending the polymeric particles in water, the suspension being stabilized, and adding thereto a normally liquid hydrocarbon boiling in the range of 28 to 100° C., and maintaining the particles in contact with the suspension at elevated temperatures and pressures until they are impregnated. Although this impregnation process is commercially useful, it does have drawbacks in that the expandable beads produced thereby are not uniform in that the hydrocarbon does not impregnate each individual bead in a uniform manner. This nonuniform impregnation results in a phenomena which is referred to as "hard cores." That is, the beads are not thoroughly impregnated and have hard centers. Because of this, when the beads are expanded, they do not give a uniform product nor do they expand to the degree that thoroughly impregnated beads do. This deficiency is particularly crucial in the production of extremely low density foam where in order to get the lowest density obtainable, the starting material must be uniform an capable of expansoin to the greatest possible degree. The only way to avoid this is to separate the beads, a time consuming and expensive step.

We have now discovered a process whereby this phenomena of hard beads may be alleviated and substantially all beads produced will be of uniform hydrocarbon content and uniformly expandable.

According to the process of our invention, previously formed polymeric particles are suspended in a closed reactor in a solution consisting of a suspending aid, water and a blowing agent at the critical pressure of the reactor. The critical pressure of the reactor is maintained solely by raising the temperature of the solution during the course of the impregnation.

The rate of impregnation of polystyrene particles is thought to be primarily dependent upon two factors, the temperature of the reaction and the pressure of the impregnant. The higher the temperature and the greater the pressure, the greater the rate of impregnation.

By pressure is meant the pressure of the impregnating system, e.g. pentane, water and not a pressure resulting from the addition of an inert atmosphere which does not have any great effect at all on the rate of impregnation.

The method according to the present invention of obtaining a maximum pressure in a reactor having a critical pressure is to raise the temperature and correspondingly and according to the gas law, the pressure by use of heat, i.e., raise the temperature of impregnation so that the maximum safe operating pressure of the reactor is always maintained. It should be emphasized that the pressure must be that asserted by the impregnating system and not that of an inert additionally applied system such as nitrogen.

It is suggested in the prior art that the pressure during impregnation be maintained by the addition of an inert atmosphere. We have found that this process though is not satisfactory.

It has been suggested that the impregnation process be carried out at temperatures below the softening point of the polymer and preferably between 5 and 20° C. below the softening temperature. The maximum softening point of any commercially available polystyrene is about 103° C. and may be as low as about 97° C. The higher softening point is due to the fact that very little residual monomer remains in the polymer. Contrary to this teaching of the prior art, we have found in our process that at a constant pressure the temperature may be raised considerably above the softening point without any deleterious effect. Temperatures of impregnation as high as about 120° C. may be used without ill effect on the resulting beads.

The advantage gained by the present process over one where pressure by an inert gas is applied or one where the temperature is kept below the softening point may be appreciated by a consideration of the following hypothetical example.

Suppose that the selected impregnation pressure were 75 p.s.i.g., the critical pressure of the reactor and at that pressure at the start of the impregnation cycle, the temperature was 90° C. As the blowing agent is absorbed in the beads, the pressure falls off to about 65 p.s.i.g. To bring this pressure back to 75 p.s.i.g., the temperature is raised to 97° C. Thus, the maximum pressure of 75 p.s.i.g. is maintained and the temperature is raised 7°. As has been stated above, both the temperature and pressure affect the rate of impregnation so that you are getting the maximum sum of the two rate governing factors.

Compare with this to an impregnation system wherein the pressure is obtained by the addition of an inert system. As the pressure falls off to 65 p.s.i.g. because of the absorption of the blowing agent by the beads, the pressure is maintained at 75 p.s.i.g. primarily by the addition of additional inert material and not by an increase in temperature which would be maintained at the original 90° C. Thus, the additional value in the impregnation due to the driving force of the difference in temperature of 7° C. is lost. It can be seen that in using any specific reactor that the process of our invention involving the use of pressure generated by temperature will give more driving force than can be obtained using the previously known processes.

The blowing agent should be added to the suspension of particles as fast as possible without foaming so that the greatest yield per operating unit is obtained. We have found that this may be accomplished without problems in about 60 to 90 minutes.

The minimum time required to properly impregnate the beads, avoiding hard cores, will vary with the particular type bead being impregnated. The two principal factors are the size of the bead, the larger the bead, the longer the impregnation time, and the molecular weight of the polymer in the bead. The higher the molecular weight, the longer the impregnation time required. The bead size is relatively much more important than is the molecular weight as far as influencing the impregnation time.

This process of impregnation, although primarily directed to the impregnation of beads formed by suspension polymerization, is not limited to such a process and particles made in other ways can be so treated, there being no limit as to shape of particle or process of manufacture.

Any of the known suspending systems both organic and inorganic may be used in the process of my invention. Such systems are recited in the previously mentioned Patents 2,950,261 and 2,983,692. Such suspending systems as hydroxyethyl cellulose, polyvinyl alcohol and calcium phosphate are equally workable. The calcium phosphate may be extended with an anionic surfactant such as is taught in U.S. Patent 2,594,913 to Grim. In the suspension system of the organic type, there may be also used diluent and hydrocarbon such as is taught in U.S. Patent 2,950,261.

The blowing agent used in the practice of this invention is a normally liquid hydrocarbon boiling in the range of about 28 to 105° C. The materials which have been found to give the most desirable results are those boiling in the range of 35 to 55° C. denoted as the pentane cut. Examples of hydrocarbons which have been found suitable are pentane, hexane, heptane, cyclopentane, cyclopentadiene, etc., and mixtures of these materials, such as, normal and isopentane.

The ratio of polymeric particles to water should be from a commercially practicable point of view as high as possible. Ratios are slightly more than one part of particle to one part of water have been found to be useful. The lower limit is from a practical viewpoint of little importance because of the commercially desirable goal of obtaining the greatest possible amount of product per utilization of the reactor.

In addition to polystyrene, styrene copolymers may equally well be used. Copolymers of styrene and isoprene or styrene and alpha-methyl-styrene may, for example, be used in the practice of the present invention.

The following examples further illustrate the practice of the invention:

EXAMPLE I

To a 300 gallon reactor there was charged in the following order 44.5 parts of water, 0.8 part tricalcium phosphate, 0.0088 part of Nacconol NRSF (sodium dodecylbenzene sulfonate), 55.5 parts of polystyrene beads about 85% which were between 10 and 20 mesh. The aqueous suspension was heated to 60° C. and an addition of 10 parts of pentane was started. At the start of the addition of the pentane, the pressure in the reactor was 5 p.s.i.g. The addition of the pentane was made in one hour during which time the pressure raised to 85 p.s.i.g. The pressure was maintained between 83 and 85 p.s.i.g. after the completion of the pentane addition for two hours by continually raising the temperature. During impregnation, the temperature had risen to 90° and thereafter it was slowly raised to compensate for the falling pressure to a maximum of 160° C. The pressure was maintained during this period at the maximum safe pressure. In this case, the reactor was designed for a maximum of 100 p.s.i.g. operation so that as explained above, the operating was 85 p.s.i.g. Thereafter the beads were separated. The volatile content was determined and found to be 6.4%. The beads were examined for hard centers and none were found. A particle size distribution was made as follows: none on a ten mesh screen, about 85% between ten and thirty mesh screen, 5.0% on a forty mesh screen and 0.6% through forty mesh screen. The expandability of the beads was then tested by pre-expanding them in a Rodman pre-expander of the type described in copending application, Ser. No. 689,195, now U.S. Patent 3,023,175, assigned to the assignee of the present invention. The beads were expanded to a density of 1.05 pounds per cubic foot at a rate of 80 pounds per hour. The pre-expanded beads were then molded at a pressure of 12 p.s.i.g. The fusion was good and the cell structure was good.

*Comparative Example I*

The same 300 gallon reactor used in Example I was charged with 44.5 parts of water, 0.8 part of tricalcium phosphate, 0.0088 part of Nacconal NRSF (sodium dodecyl phosphate) and 55.5 parts of polystyrene beads, about 85% of which were between 10 and 20 mesh. The reactor pressure was about 6 p.s.i.g. The reactor was closed and heated to 60° C. The pressure rose to 12 p.s.i.g. The addition of 10 parts of normal pentane was begun. The addition lasted 60 minutes during which time a temperature of about 90° C. and a pressure of about 72 p.s.i.g. was maintained. After the addition was completed, the temperature was maintained in the range of about 90° C. for the 3.5 hours required to complete the impregnation. During this time, the pressure fell off slowly and at the completion of the impregnation was 63 p.s.i.g.

The beads were separated and the volatile content determined and found to be 6.5%. A few beads were found to have hard centers. The expandability of the beads was determined by putting them through the Rodman Pre-Expander and only slight lumping occurred. The fusion of the beads at 12 p.s.i.g. was determined and was found to be good.

This example is illustrative of the heretofore used process wherein impregnation is carried out with varying temperature and pressure over a relatively long time period.

*Comparative Example II*

Comparative Example I was repeated except that impregnation was carried out for only two hours. When the beads were separated, a large percentage were found to have hard cores. This resulted from incomplete penetration of the blowing agent into the beads.

*Comparative Example III*

Example I was repeated except that impregnation was stopped at the end of one hour and 45 minutes. When the beads were separated, they were found to contain a relatively high percentage of hard cores indicating that at this pressure, 85 p.s.i.g., impregnation was incomplete.

This example, as well as Comparative Example II, illustrates that this is a minimum time. Even using the process of the invention, there is a minimum time required at a given pressure in order to obtain complete impregnation. In this instance, a pressure of 85 p.s.i.g., the minimum time required is about 2 hours. At other higher pressures, the minimum time would be somewhat less while at lower pressures, it would be somewhat more.

EXAMPLE II

Example I was repeated except that the impregnation was carried out for a period of four hours. When the beads were separated, they were found to contain no hard centers and when they were pre-expanded, there was no lumping. When the beads were molded at 12 p.s.i.g., the cell structure was small and the fusion fair.

EXAMPLE III

Example I was again repeated except that the impregnation time was three hours. The beads were recovered and found to have no hard centers. When tested for pre-expansion, there was a slight amount of lumping. The fusion at 12 p.s.i.g. was found to be excellent.

The Examples II and III illustrate further practice of the invention using more than minimum impregnation time. It should be noted though that the required impregnation time is less than the four hours heretofore required.

The above examples illustrate the criticality of a minimum impregnation time of at least two hours at a constant pressure of about 83 to 86 p.s.i.g. The examples also show that at pressures less than this, impregnation is not complete in the same time and further show that a longer impregnation time, although satisfactory, is not desirable in that there is no advantage gained by its use.

Using reactors which were built to operate at higher pressures, it is, of course, possible to reduce the impregnation time required in order to get a homogeneous impregnation. However, according to the teaching of this invention, this minimum impregnation time is accomplished by operating at, or as close to as possible, the upper pressure limit of the particular reactor and maintaining the pressure by the addition of heat to the reactor.

We claim:

1. A process for impregnating previously formed polymeric styrene particles with a normally liquid hydrocarbon blowing agent comprising: suspending, in a closed reactor, said particles in a solution consisting of a suspending aid, water and said blowing agent, heating said solution to a temperature of about 90° C. to bring said solution to the critical pressure of said reactor and maintaining said critical pressure for at least about two hours, but less than four hours until said particles are impregnated solely by continually raising the temperature of said solution to elevated temperatures between 90 and 120° C.

2. A process for impregnating previously formed polystyrene particles with a normally liquid hydrocarbon blowing agent comprising: suspending, in a closed reactor, said particles in a solution consisting of a suspending aid, water and said blowing agent, heating said solution to a temperature of about 90° C. to bring said solution to the critical pressure of said reactor and maintaining said critical pressure for at least about two hours, but less than four hours solely by continually raising the temperature of said solution to elevated temperatures between 90 and 120° C.

3. The process of claim 2 wherein the blowing agent is pentane.

4. The process of claim 3 wherein the suspending agent consists of tricalcium phosphate extended with sodium dodecylbenzene sulfonate.

5. In the impregnation of styrene polymer particles with a normally liquid hydrocarbon blowing agent boiling in the range of 28°–95° C., in a closed reactor, by suspending said particles in an aqueous mixture of said hydrocarbon, and heating said mixture to a temperature of about 90° C. to bring said mixture to a pressure not more than 5% below the critical pressure of said reactor, the improvement comprising: conducting said impregnation at a constant pressure not more than 5% below the critical pressure of said reactor for at least about two hours, but less than four hours, said constant pressure being maintained solely by continually raising the temperature of said aqueous mixture to elevated temperatures between 90 and 120° C.

6. In the impregnation of polystyrene particles with pentane, in a closed reactor, by suspending said particles in an aqueous mixture of said pentane, and heating said mixture to a temperature of about 90° C. to bring said mixture to a pressure not more than 5% below the critical pressure of said reactor, the improvement comprising: conducting said impregnation at a constant pressure not more than 5% below the critical pressure of said reactor for at least about two hours, but less than four hours, said constant pressure being maintained solely by continually raising the temperature of said aqueous mixture.

7. In the impregnation of polystyrene particles with a normally liquid hydrocarbon blowing agent boiling in the range of 28°–95° C., in a closed reactor, by suspending said particles in an aqueous mixture of said hydrocarbon, and heating said mixture to a temperature of about 90° C. to bring said mixture to a pressure not more than 5% below the critical pressure of said reactor, the improvement comprising: conducting said impregnation at a constant pressure below the critical pressure of said reactor for at least about two hours, but less than four hours, said constant pressure being maintained solely by continually raising the temperature of said aqueous mixture to elevated temperatures between 90 and 120° C.

References Cited
UNITED STATES PATENTS

| | | | |
|---|---|---|---|
| 2,950,261 | 8/1960 | Buchholtz et al. | 260—2.5 |
| 2,983,692 | 5/1961 | D'Alelio | 260—2.5 |

SAMUEL H. BLECH, *Primary Examiner.*

MURRAY TILLMAN, LEON J. BERCOVITZ, *Examiners.*

M. FOELAK, *Assistant Examiner.*